US011440593B2

(12) United States Patent
Takahashi et al.

(10) Patent No.: US 11,440,593 B2
(45) Date of Patent: Sep. 13, 2022

(54) VEHICLE BODY LOWER STRUCTURE

(71) Applicants: TOYOTA JIDOSHA KABUSHIKI KAISHA, Aichi (JP); SUBARU CORPORATION, Tokyo (JP)

(72) Inventors: Naoki Takahashi, Miyoshi (JP); Shunji Shibata, Anjo (JP)

(73) Assignees: TOYOTA JIDOSHA KABUSHIKI KAISHA, Aichi (JP); SUBARU CORPORATION, Tokyo (JP)

( * ) Notice: Subject to any disclaimer, the term of this patent is extended or adjusted under 35 U.S.C. 154(b) by 3 days.

(21) Appl. No.: 17/194,313

(22) Filed: Mar. 8, 2021

(65) Prior Publication Data
US 2021/0284243 A1    Sep. 16, 2021

(30) Foreign Application Priority Data

Mar. 16, 2020  (JP) .............................. JP2020-045093

(51) Int. Cl.
*B62D 25/02*    (2006.01)
*B62D 21/15*    (2006.01)

(52) U.S. Cl.
CPC ......... *B62D 25/025* (2013.01); *B62D 21/157* (2013.01)

(58) Field of Classification Search
CPC ... B62D 25/025; B62D 21/157; B60K 1/0438
USPC ............................................ 296/209, 187.12
See application file for complete search history.

(56) References Cited

U.S. PATENT DOCUMENTS

| 8,696,051 B2 * | 4/2014 | Charbonneau ....... B62D 25/025 |
| | | 296/187.12 |
| 2017/0305251 A1 * | 10/2017 | Hara ....................... B60L 50/64 |
| 2018/0126933 A1 | 5/2018 | Kawase et al. |

FOREIGN PATENT DOCUMENTS

| DE | 112018002641 T5 * | 2/2020 | ............. B60K 1/04 |
| JP | 2017226353 A * | 12/2017 | |
| JP | 201875939 A | 5/2018 | |
| WO | WO-2019096675 A1 * | 5/2019 | ............... B60K 1/04 |

\* cited by examiner

*Primary Examiner* — Dennis H Pedder
(74) *Attorney, Agent, or Firm* — Hauptman Ham, LLP

(57) ABSTRACT

A vehicle body lower structure may include: a rocker; an energy absorbing member (an EA member) arranged under the rocker, the EA member being a hollow beam; and a collar penetrating an upper plate of the EA member and welded to the upper plate. The collar is arranged between the rocker and a lower plate of the EA member. The EA member includes a first/a second/a third vertical plates and a diagonal brace, these plates connect the upper plate and the lower plate of the EA member to each other. The second vertical plate is positioned between the first and the third vertical plates. The collar passes between the first vertical plate and the second vertical plate. The diagonal brace connects a first inner corner where the second vertical plate meets the upper plate and a second inner corner where the third vertical plate meets the lower plate.

4 Claims, 4 Drawing Sheets

VEHICLE BODY LOWER STRUCTURE

CROSS-REFERENCE TO RELATED APPLICATION

This application claims priority to Japanese Patent Application No. 2020-045093 filed on Mar. 16, 2020, the contents of which are hereby incorporated by reference into the present application.

TECHNICAL FIELD

The art disclosed herein relates to a vehicle body lower structure. It relates, in particular, to a vehicle body lower structure in which a power source is arranged adjacent to a rocker.

BACKGROUND

In electric vehicles, a power source configured to supply power to an electric traction motor may be arranged adjacent to a rocker. The power source may be a battery, a fuel cell, or the like. The rocker is a frame extending along a front-rear direction of the vehicle body at a lower lateral part of the vehicle body. The rocker may also be referred to as "side sill".

In order to protect the power source from an impact of lateral collision to the lateral part of the vehicle body, a member (energy absorbing member) configured to absorb impact energy caused by lateral collision may be disposed along the rocker. Japanese Patent Application Publication No. 2018-75939 describes an example of the energy absorbing member. The energy absorbing member described in Japanese Patent Application Publication No. 2018-75939 extends along a front-rear direction of a vehicle body and is in contact with a bottom of a rocker. To achieve both strength and an energy absorbing function, the energy absorbing member is hollow, and includes a reinforcement plate therein. Hereafter, an energy absorbing member may be referred to as "EA member" for convenience of description.

SUMMARY

To provide a clearance between a rocker and an EA member, a collar may be employed. The collar penetrates an upper plate of the EA member. An upper end of the collar is in contact with the rocker and a lower end of the collar is in contact with a lower plate of the EA member. The collar is welded to the upper plate. In addition to such a configuration, it is desirable that reinforcement plate(s) is disposed in the EA member to enhance strength of the EA member. If the reinforcement plate(s) is connected to a portion close to a welding point between the collar and the upper plate, much of heat generated in welding may be lost by being diffused to the reinforcement plate, by which the collar may not be securely welded to the upper plate.

In a vehicle body lower structure disclosed herein, an EA member (an energy absorbing member) may be a hollow beam and may include a first vertical plate, a second vertical plate, and a third vertical plate connecting an upper plate and a lower plate of the EA member to each other. The first vertical plate, the second vertical plate and the third vertical plate may be arranged along a vehicle lateral direction such that the second vertical plate is positioned between the first vertical plate and the third vertical plate. A collar may pass between the first vertical plate and the second vertical plate.

The EA member may further include a diagonal brace. The diagonal brace may connect a first inner corner where the second vertical plate meets the upper plate and a second inner corner where the third vertical plate meets the lower plate. The diagonal brace enhances strength of the EA member. Meanwhile, an upper end of the diagonal brace may be connected to the first inner corner (a corner where the second vertical plate meets the upper plate) that is at a portion close to the collar. Thus, heat generated in welding the collar and the upper plate to each other could be lost by being diffused to the diagonal brace, which may result in insufficient welding strength between the collar and the upper plate. To address this, a ratio of a thickness of the first vertical plate positioned opposite from the diagonal brace across the collar to a thickness of the upper plate may be set from 0.5 to 2.0. In other words, the ratio of the two thicknesses may be set to be from 0.5 to 2.0.

In welding intersecting two plates to each other, heat generated in welding is equally diffused to the two plates and welding can be evenly performed when a ratio of thicknesses of the two plates is from 0.5 to 2.0. In other words, high welding strength can be achieved. In the vehicle body lower structure disclosed herein, the collar may pass between the first vertical plate and the second vertical plate, and the diagonal brace may be provided at a portion close to the second vertical plate. Although welding strength between the upper plate and the collar may be degraded at the portion close to the second vertical plate, the upper plate and the collar can be welded to each other with high strength at a portion close to the first vertical plate, by which degradation of the welding strength at the portion close to the second vertical plate can be compensated. As a result, sufficient welding strength can be ensured between the collar and the upper plate.

As described above, the ratio of a thickness of the upper plate of a welding portion to be welded to the collar to the thickness of the first vertical plate may be from 0.5 to 2.0. A thickness of a portion of the upper plate away from the welding portion may be thin. A weight of the EA member can be reduced by reducing the thickness of the portion of the upper plate away from the welding portion. In particular, the thickness of the upper plate at the portion away from the welding portion and outward of the collar in the vehicle lateral direction may be reduced.

The diagonal brace is useful for preventing deformation of the EA member in a structure in which a power source is supported by the EA member. A rocker and the EA member may be fixed to each other with a bolt passing through the collar. Further, a bulkhead may be disposed in the rocker as a reinforcement member. In such a case, the rocker, the bulkhead, and EA member may be fixed to each other with the bolt.

Details and further developments of the art disclosed herein will be described in DETAILED DESCRIPTION as below.

DETAILED DESCRIPTION

Embodiment

Figure 1:
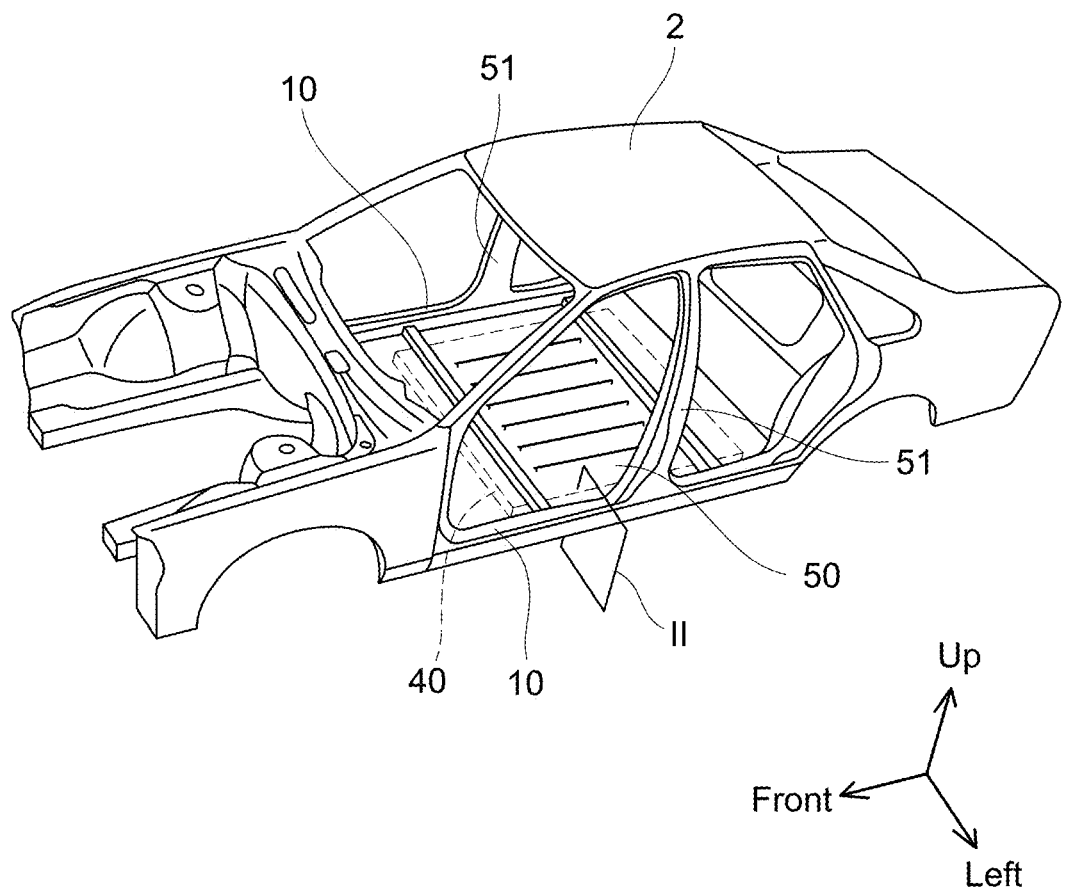
FIG. 1 is a perspective view of a vehicle body.

A vehicle body lower structure 3 according to an embodiment will be described with reference to drawings. FIG. 1 is a perspective view of a vehicle body 2. In the coordinate system of FIG. 1, "Left" indicates "left" when the vehicle is viewed from the rear toward the front. The "Left" in the coordinate system has the same meaning in all of the drawings.

The vehicle body 2 includes a pair of rockers 10. The rockers 10 are arranged respectively at lower lateral parts of the vehicle body 2 in a vehicle lateral direction. Each rocker 10 is an elongated beam and extends along a front-rear direction of the vehicle body 2. Lower ends of center pillars 51 are connected respectively to the rockers 10 at portions close to centers of the rockers 10 in a longitudinal direction of the rockers 10. The pair of rockers 10 and the center pillars 51 are one type of frame configured to secure strength of the vehicle body 2. Each of the rockers 10 is formed by press working operations on a metal plate (typically, a steel plate).

A battery pack 40 and a floor panel 50 are arranged between the pair of rockers 10. The battery pack 40 includes a large number of battery cells therein. The plurality of battery cells is connected in series, and capable of outputting a high voltage. The battery pack 40 (the plurality of battery cells) is configured to supply power to an electric traction motor (not shown).

The floor panel 50 corresponds to a floor of a cabin. Ends of the floor panel 50 in the vehicle lateral direction are fixed respectively to the rockers 10. The battery pack 40 is arranged under the floor panel 50. Although details will be described later, energy absorbing members (not shown in FIG. 1) are arranged respectively along the rockers 10, and the battery pack 40 is supported by the pair of rockers 10 via the energy absorbing members. The battery pack 40 may be supported by the rockers 10 via the floor panel 50 as well as via the energy absorbing members.

The energy absorbing members are arranged on both sides of the battery pack 40 in the vehicle lateral direction. As aforementioned, the energy absorbing member(s) will be referred to as EA member(s) for convenience of description.

Figure 2:
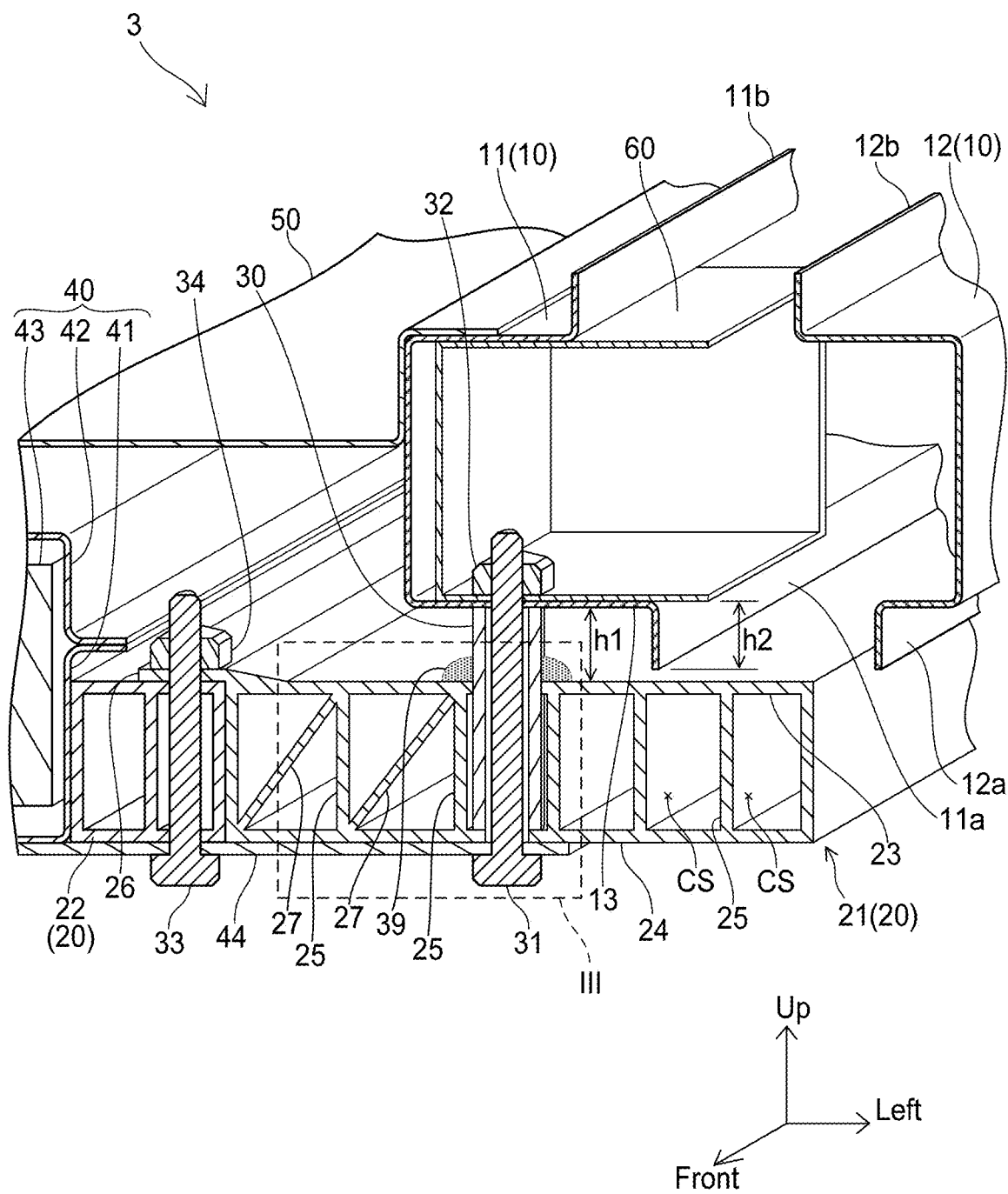
FIG. 2 is a cross-sectional view of the vehicle body cut along a plane II of FIG. 1.

FIG. 2 shows a cross section of the vehicle body 2 cut along a plane II in FIG. 1. FIG. 2 shows a left part of the lower structure 3 of the vehicle body 2. As aforementioned, the battery pack 40 is fixed to the rockers 10 via the EA members 20 (energy absorbing members 20) at lower right and lower left parts of the vehicle body 2. The vehicle body 2 is symmetrical with respect to a right-left direction, thus the right part of the lower structure 3 of the vehicle body 2 has the same structure as that of FIG. 2. That is, the vehicle body lower structure 3 of the embodiment includes the pair of rockers 10 and the pair of EA members 20, and each of the EA members 20 is arranged along corresponding one of the pair of rockers 10. The left part of the lower structure 3 of the vehicle body 2 will be described hereinafter.

The battery pack 40 includes a lower cover 41, an upper cover 42, and a plurality of battery cells 43. A container is configured by the lower cover 41 and the upper cover 42, and the plurality of battery cells 43 is housed within the container. Each of the lower cover 41 and the upper cover 42 is provided with a flange, and the container is configured by the flanges of the lower cover 41 and the upper cover 42 being joined.

The rocker 10 is configured of a rocker inner panel 11 and a rocker outer panel 12. The rocker inner panel 11 has a cornered U shape (a channel shape) and is disposed with the U shape lying down on its side. The rocker inner panel 11 includes a lower flange 11a and an upper flange 11b. The lower flange 11a extends downward from a lower edge of the lying U shape of the rocker inner panel 11. The upper flange 11b extends upward from an upper edge of the lying U shape of the rocker inner panel 11. The rocker outer panel 12 has the same shape as the rocker inner panel 11. The rocker outer panel 12 includes a lower flange 12a and an upper flange 12b, and the lower flange 12a and the upper flange 12b face the lower flange 11a and the upper flange 11b of the rocker inner panel 11, respectively. The lower flanges 11a and 12a are welded to each other and the upper flanges 11b and 12b are welded to each other, which result in the rocker 10 being a hollow rectangular beam. In FIG. 2, the rocker outer panel 12 is depicted away from the rocker inner panel 11 to help understanding.

A bulkhead 60 is arranged in the rocker 10. The bulkhead 60 is a reinforcement member for enhancing strength of the rocker 10. The bulkhead 60 is attached to inside of the rocker inner panel 11 before the rocker inner panel 11 and rocker outer panel 12 are joined to each other. The bulkhead 60 is fixed to the rocker inner panel 11 by welding or with a bolt (not shown). A nut 32 is fixed to inside of the bulkhead 60. The nut 32 is fixed to the rocker inner panel 11 by welding.

The EA member 20 is configured of a first EA member 21 and a second EA member 22. The first EA member 21 is arranged under the rocker 10. The second EA member 22 is arranged between the first EA member 21 and the battery pack 40. The first EA member 21 is fixed to the rocker 10. The second EA member 22 is connected to the first EA member 21 and also connected to the battery pack 40.

The EA member 20 (each of the first EA member 21 and the second EA member 22) is a hollow rectangular beam. The EA member 20 extends along the rocker 10 in the front-rear direction of the vehicle body 2. The EA member 20 is configured to absorb collision energy generated when a lateral collision occurs to the vehicle to protect the battery pack 40. The EA member 20 is configured to absorb the collision energy by being crushed in the vehicle lateral direction by an impact of the collision. The rocker 10 also contributes to absorption of the collision energy, however, the rocker 10 alone may be insufficient to absorb all the collision energy on its own. To address this, the hollow EA member 20 is arranged along the rocker 10.

A support plate 44 extends outward from a lower surface of the battery pack 40 in the vehicle lateral direction. The support plate 44 and the first EA member 21 are also joined together and fixed to each other with a bolt 31 and the nut 32. The battery pack 40 can be fixed to the EA member 20 firmly by fixing the support plate 44 extending from the battery pack 40 to the first EA member 21.

A connecting structure of the first EA member 21 and the second EA member 22 will be described. A flange 26 extends from an end of the upper plate 23 of the first EA member 21 towards the vehicle center. The second EA member 22 is fixed to the flange 26 of the first EA member 21 with a bolt 33 and a nut 34. The support plate 44 extending from the battery pack 40 is also fixed to the second EA member 22 with the bolt 33. The second EA member 22 is held and fixed between the flange 26 of the first EA member 21 and the support plate 44 of the battery pack 40. The second EA member 22 is bonded to a side surface of the lower cover 41 of the battery pack 40. The battery pack 40 and the second EA member 22 are fixed firmly to each other with the bolt 33 and an adhesive material.

The EA member 20 is divided into the first EA member 21 which is fixed to the rocker 10 and the second EA member 22 which is bonded to the battery pack 40. The second EA member 22 is detachable from the first EA member 21. The EA member 20 can be applied to a variety of vehicles having different body widths by adjusting a combination of the first EA member 21 and the second EA member 22.

Strength of the EA member 20 is determined in advance, for example, by simulation such that the EA member 20 can effectively absorb collision energy. An inner space of the first EA member 21 is partitioned into several cell spaces CS by a plurality of vertical plates 25 which connects an upper plate 23 and a lower plate 24 of the first EA member 21 to each other. In some of the several cell spaces, diagonal braces 27 diagonally extending in the rectangular cell space are respectively disposed. The strength of the first EA member 21 can be adjusted by appropriately selecting respective numbers and/or thicknesses of the vertical plates 25 and the diagonal braces 27. The strength of the EA member 20 is set to be at least lower than strength of the battery pack 40. However, the EA member 20 has enough strength to support the battery pack 40.

An advantage of including the diagonal braces 27 will be described below. As shown in FIG. 2, the battery pack 40 is supported by the EA member 20, and the EA member 20 is fixed to the rocker 10 by the bolt 31. A weight of the battery pack 40 is applied to a portion of the EA member 20 close to the battery pack 40. Due to this, a shear force is applied in an up-down direction to the first EA member 21 between the battery pack 40 and the bolt 31. Due to this shear force, the first EA member 21 deforms. The diagonal braces 27 prevent this deformation of the first EA member 21.

The shear force is great between the battery pack 40 and the bolt 31 and small at a portion farther away from the battery pack 40 beyond the bolt 31. Due to this, the diagonal braces are not disposed in cell spaces CS farther away from the battery pack 40 beyond the bolt 31.

As aforementioned, the first EA member 21 is arranged under the rocker 10. Meanwhile, the rocker 10 is provided with the lower flange 11a (12a) extending downward from a bottom plate 13 of the rocker 10. The first EA member 21 needs to be arranged such that it can avoid interference with the lower flange 11a (12a). If the first EA member 21 is divided into an inner portion (portion closer to the center of the vehicle body in the vehicle lateral direction) and an outer portion relative to the lower flange 11a (12a), the structure of the EA member thereby becomes complex. In the vehicle body lower structure 3 of the embodiment, the interference between the first EA member 21 and the lower flange 11a (12a) can be avoided by a collar 30 being arranged between the first EA member 21 and the rocker 10. Placing the first EA member 21 under the lower flange 11a (12a) allows the first EA member 21 to have a simple shape and extend outward relative to the lower flange 11a (12a) in the vehicle lateral direction.

The collar 30 is a metal cylinder. In other words, the collar 30 is a spacer configured to secure a clearance between the rocker 10 and the first EA member 21. As shown in FIG. 2, a height h1 of the collar 30 above the first EA member 21 is greater than a height h2 of the lower flange 11a (12a). The collar 30 secures the clearance having the distance h1 between the bottom plate 13 of the rocker 10 and the upper plate 23 of the first EA member 21. Because the height of the lower flange 11a (12a) is h2 (<h1), the lower flange 11a (12a) does not interfere with the first EA member 21. Thus, since a simple rectangular beam shape can be employed as the shape of the first EA member 21, manufacturing costs for the EA member 21 can thereby be reduced.

A structure around the collar 30 will be described. The collar 30 passes through a hole 23a provided in the upper plate 23 of the first EA member 21. An upper end of the collar 30 is in contact with a lower surface of the bottom plate 13 of the rocker 10. A lower end of the collar 30 is in contact with an upper surface of the lower plate 24. The collar 30 is welded to the upper plate 23. A weld bead 39 is provided at a portion where the collar 30 meets the upper plate 23.

The first EA member 21, the rocker 10, and a bulkhead 60 are joined together and fixed to each other with the nut 32 and the bolt 31 passing through the collar 30.

When the battery pack 40 vibrates up and down while the vehicle is running, the collar 30 also vibrates up and down, and thus a vibration load is applied to the rocker 10 in an up-down direction. Deformation of the rocker 10 caused by the vibration of the collar 30 in the up-down direction is small because the bulkhead 60 and the bottom plate 13 are arranged between the collar 30 and the nut 32.

Figure 3:
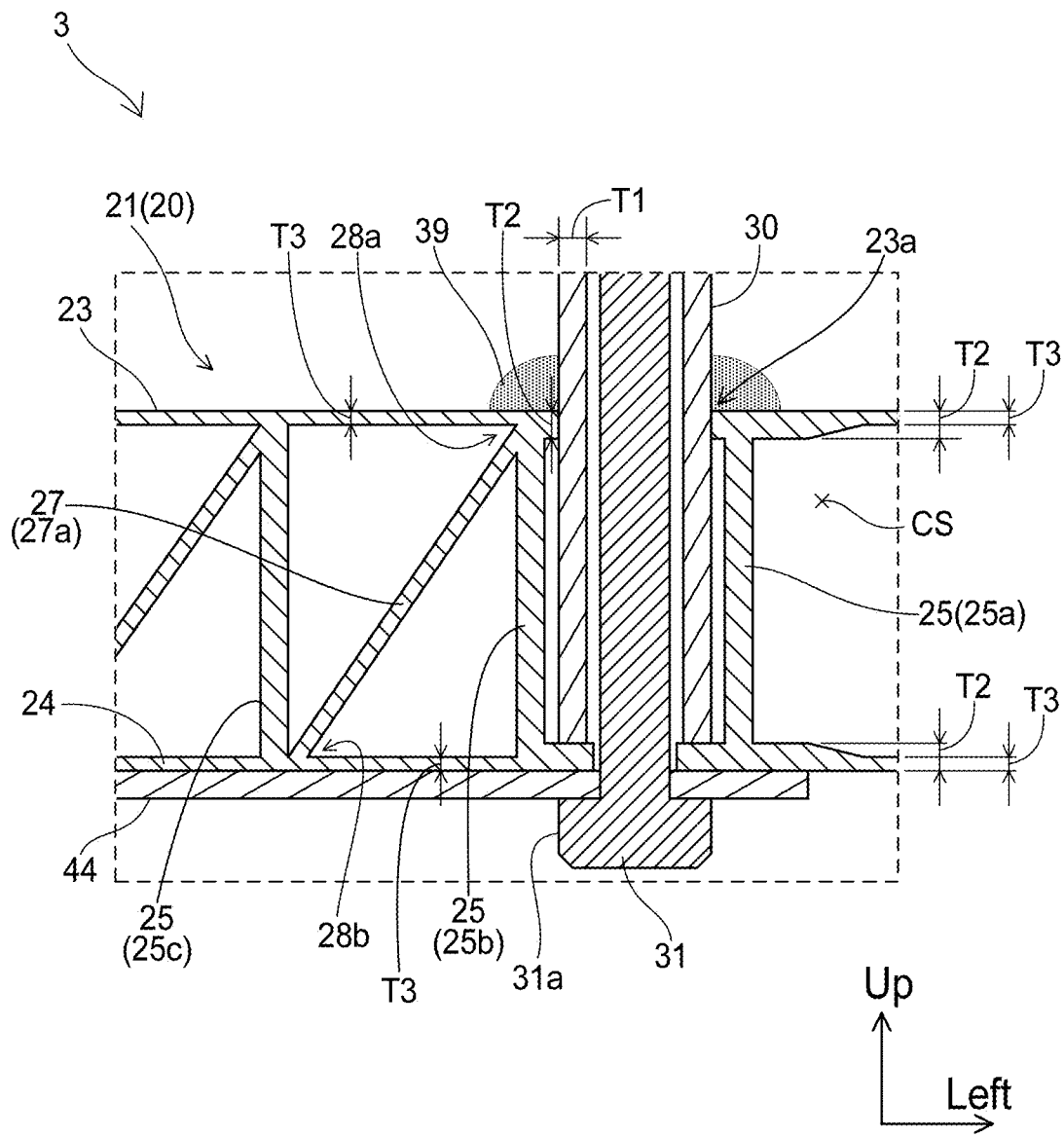
FIG. 3 shows an enlarged view of an area surrounded by a broken line III of FIG. 2.

The structure around the collar 30 will more specifically be described. FIG. 3 shows an enlarged view of an area in a rectangle III of FIG. 2 surrounded by a broken line. As described above, the first EA member 21 is a hollow rectangular beam, and includes the plurality of vertical plates 25 therein. The vertical plates 25 connect the upper plate 23 and the lower plate 24 of the first EA member 21 to each other. The vertical plates 25 extend along the front-rear direction of the vehicle within the first EA member 21. An inner space of the first EA member 21 is partitioned into several cell spaces CS by the plurality of vertical plates 25. The cell spaces CS are also rectangular, and the diagonal braces 27 diagonally extending in the rectangular cell spaces are respectively disposed in some of the cell spaces. The diagonal braces 27 also extend in the front-rear direction of the vehicle within the first EA member 21.

Here, one of the vertical plates 25 adjacent to a right side of the collar 30 in the drawing is referred to as a first vertical plate 25a, and one of the vertical plates 25 adjacent to a left side of the collar 30 in the drawing is referred to as a second vertical plate 25b. Further, one of the vertical plates 25 adjacent to a left side of the second vertical plate 25b in the drawing is referred to as a third vertical plate 25c. In other words, the first vertical plate 25a, the second vertical plate 25b, and the third vertical plate 25c are arranged toward the vehicle center in the vehicle lateral direction such that the second vertical plate 25b is positioned between the first vertical 25a plate and the third vertical plate 25c. One of the diagonal braces 27 disposed between the second vertical plate 25b and the third vertical plate 25c is referred to as a diagonal brace 27a.

The collar 30 passes through one of the cell spaces CS between the first vertical plate 25a and the second vertical plate 25b. The diagonal brace 27a is provided between the second vertical plate 25b and the third vertical plate 25c. The diagonal brace 27a connects a first inner corner 28a where the second vertical plate 25b meets the upper plate 23 and a second inner corner 28b where the third vertical plate 25c meets the lower plate 24.

As aforementioned, the collar 30 and the upper plater 23 are welded to each other. The weld bead 39 is provided on the upper plate 23 around the collar 30. A thickness T2 of the upper plate 23 under the weld bead 39 is substantially equal to a thickness T1 of the collar 30 (a thickness T1 of a cylinder of the collar 30), or slightly smaller than the thickness T1. A ratio of the thickness T2 of the upper plate 23 to the thickness T1 of the collar 30 may be from 0.5 to 2.0.

When intersecting two plates (the collar 30 and the upper plate 23) are welded to each other, it is desirable that thicknesses of the two plates are substantially equal. If the thicknesses of the two plates are greatly different, welding heat is diffused in one plate having a greater thickness, and a temperature of the one plate rises more slowly as compared to the other plate having a smaller thickness. Due to this, in welding, the temperature of the plate having the smaller thickness becomes higher than the temperature of the plate having the greater thickness. Thus, there is a risk that the plate having the smaller thickness melts before a welding material melts on the plate having the greater thickness. When the plate having the smaller thickness melts, strength of the welded point may be degraded. If, on the other hand, the welding is finished before the plate having the smaller thickness melts, the plate having the greater thickness does not fully melt, which may also degrade strength of the welding point. When the ratio of the thicknesses of the two intersecting plates are from 0.5 to 2.0, the two plates are evenly heated, and optimal welding strength can be achieved.

The diagonal brace 27a is connected to the first inner corner 28a where the second vertical plate 25b meets the upper plate 23. Heat generated in welding the collar 30 and the upper plate 23 to each other is diffused to the diagonal brace 27a as well. There is a risk that the collar 30 and the upper plate 23 cannot be suitably welded to each other on one side of the collar 30 closer to the second vertical plate 25b. However, since no diagonal brace is provided on another side of the collar 30 closer to the first vertical plate 25a, the collar 30 and the upper plate 23 can be firmly welded to each other.

The first vertical plate 25a and the second vertical plate 25b are connected to the upper plate 23 under the weld bead 39. The heat generated in the welding is diffused to the first vertical plate 25a and the second vertical plate 25b as well. Thus, it is desirable that the thickness T2 of the upper plate 23 is less than or equal to the thickness T1 of the collar 30. In other words, the thickness T2 of the upper plate 23 may be from 0.5 to 1.0 times the thickness T1 of the collar 30 (0.5 T1≤T2≤T1).

Figure 4:
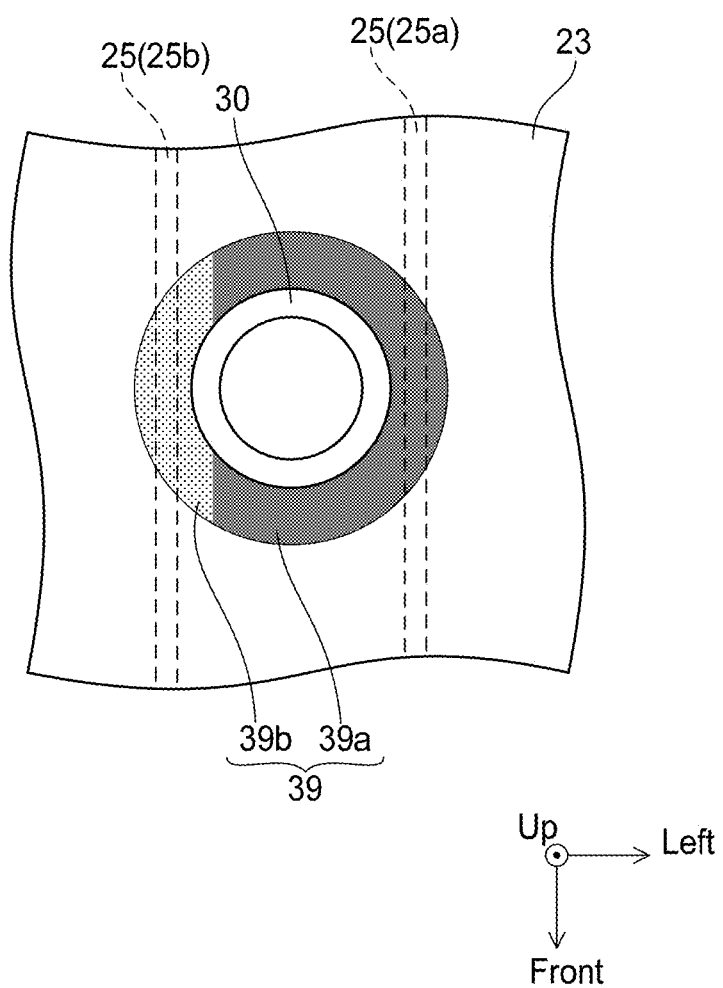
FIG. 4 shows a plan view of an upper plate of an EA member around a collar.

FIG. 4 shows a plan view of the upper plate 23 of the first EA member 21 around the collar 30. The weld bead 39 surrounds the collar 30. In FIG. 4, the weld bead 39 is depicted in gray to help understanding. The weld bead 39 joins the collar 30 and the upper plate 23 to each other. As aforementioned, since the diagonal brace 27a is connected to the inner corner 28a (see FIG. 3) where the upper plate 23 meets the second vertical plate 25b, the welding strength may not be sufficient at a portion close to the second vertical plate 25b. A region 39b depicted in light gray in FIG. 4 shows a region where the welding strength may not be sufficient. On the other hand, the collar 30 and the upper plate 23 are firmly welded to each other at a portion away from the second vertical plate 25b. A region 39a depicted in dark gray in FIG. 4 shows a region where the collar 30 and the upper plate 23 are firmly welded to each other. Half or more of a circumference of the collar 30 is firmly welded to the upper plate 23, which can secure sufficient welding strength between the collar 30 and the upper plate 23.

The thickness of the upper plate 23 will be described. As aforementioned, the thickness of the upper plate 23 is T2 under the weld bead 39, and the thickness T2 is from half to twice the thickness T1 of the collar 30. On the other hand, a thickness T3 of the upper plate 23 at a portion away from the weld bead 39 is smaller than the thickness T2 under the weld bead 39. A thickness of the upper plate 23 is constant in the front-rear direction of the vehicle, while the upper plates 23 has two different thicknesses (the thickness T2 and the thickness T3) in the vehicle lateral direction. In other words, the thickness T3 of the upper plate 23 at the portion away from the weld bead 39 in the vehicle lateral direction is smaller than the thickness T2. Under the weld bead 39, the ratio of the thickness T2 of the upper plate 23 to the thickness T1 of the collar 30 is from 0.5 to 2.0. On the other hand, the thickness T3 of the upper plate 23 at the portion away from the weld bead 39 in the vehicle lateral direction is smaller than the thickness T2. With such a configuration, the collar 30 and the upper plate 23 can be firmly welded to each other, and a weight of the first EA member 21 can be reduced.

Similarly for the lower plate 24, a thickness T2 of the lower plate 24 around the collar 30 is equal to the thickness T2 of the upper plate 23, and a thickness T3 at a portion away from the collar 30 in the vehicle lateral direction is smaller than the thickness T2 of the lower plate 24. The lower plate 24 is fastened to an end of the collar 30 with the bolt 31. The thickness T2 of the lower plate 24 is increased around the collar 30, and the thickness T3 of the lower plate 24 is reduced at the portion away from the collar 30. With this configuration, the weight of the first EA member 21 can be reduced while strength of the region fastened with the bolt 31 can be increased.

Points to be noted with regard to the art described in the embodiment will be described. Cross sectional shapes of the EA member 20 (the first EA member 21, the second EA member 22) cut along planes perpendicular to the front-rear direction of the vehicle are identical regardless of cutting positions along the front-rear direction. The EA member 20 (the first EA member 21, the second EA member 22) may be formed by extrusion molding of metal (typically, aluminum).

One bulkhead 60 may be fixed to the rocker 10 with a single bolt 31. Alternatively, one bulkhead 60 may be fixed to the rocker 10 with a plurality of bolts. Each of the bolts fixing one bulkhead 60 may pass through corresponding one of collars 30, and the bolts may fix the EA member 20 to the rocker 10 via the collars 30. One support plate 44 may be fixed to the one bulkhead 60 with a plurality of bolts.

The battery pack 40 is an example of "power source". The battery pack 40 includes the plurality of battery cells. The power source arranged between the pair of rockers 10 is not limited to the battery pack 40. The power source may be a device which houses a capacitor or a device which houses fuel cells.

The thickness of the upper plate 23 of the EA member 20 between the pair of vertical plates (the first vertical plate 25a and the second vertical plate 25b) adjacent to the bolt 31 may be greater than a thickness thereof at portions respectively outward of the pair of the vertical plates. An amount of heat diffused to the upper plate 23 in welding can be reduced by reducing the thickness of the upper plate 23 at the portions away from the bolt 31.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A vehicle body lower structure comprising:
a rocker arranged at a lower lateral part of a vehicle body and extending in a front-rear direction of the vehicle body;
a power source arranged adjacent to the rocker;
an energy absorbing member arranged under the rocker, the energy absorbing member being a hollow beam; and
a collar penetrating an upper plate of the energy absorbing member and welded to the upper plate, wherein an upper end of the collar is in contact with the rocker and a lower end of the collar is in contact with a lower plate of the energy absorbing member,
wherein
the energy absorbing member includes a first vertical plate, a second vertical plate, a third vertical plate and a diagonal brace,
the first vertical plate, the second vertical plate, and the third vertical plate connect the upper plate and the lower plate of the energy absorbing member to each other,
the first vertical plate, the second vertical plate and the third vertical plate are arranged along a vehicle lateral direction such that the second vertical plate is positioned between the first vertical plate and the third vertical plate,
the collar passes between the first vertical plate and the second vertical plate,
the diagonal brace connects a first inner corner where the second vertical plate meets the upper plate and a second inner corner where the third vertical plate meets the lower plate, and
a ratio of a thickness of the upper plate to a thickness of the collar is from 0.5 to 2.0.

2. The vehicle body lower structure of claim 1, wherein
an under-bead thickness of the upper plate in an area under a weld bead which joins the collar to the upper plate is thicker than a thickness of the upper plate in an area away from the weld bead, and
a ratio of the under-bead thickness of the upper plate to the thickness of the collar is from 0.5 to 2.0.

3. The vehicle body lower structure of claim 1, wherein the power source is supported by the energy absorbing member.

4. The vehicle body lower structure of claim 1, wherein the rocker and the energy absorbing member are fixed to each other by a bolt passing through the collar.

* * * * *